(12) United States Patent
Albasheir (10) Patent No.: US 12,445,932 B2
(45) Date of Patent: Oct. 14, 2025

(54) USING EDGE NODES AS PROXIES TO SELECT UPF POSITIONING

(71) Applicant: T-Mobile USA, Inc., Bellevue, WA (US)

(72) Inventor: Suliman Albasheir, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 637 days.

(21) Appl. No.: 17/823,077

(22) Filed: Aug. 29, 2022

(65) Prior Publication Data

US 2022/0417826 A1 Dec. 29, 2022

Related U.S. Application Data

(63) Continuation-in-part of application No. 17/095,146, filed on Nov. 11, 2020, now abandoned.

(51) Int. Cl.
*H04W 40/18* (2009.01)
*H04W 40/12* (2009.01)

(52) U.S. Cl.
CPC .......... *H04W 40/12* (2013.01); *H04W 40/18* (2013.01)

(58) Field of Classification Search
CPC ..... H04W 40/12; H04W 40/18; H04W 88/14; H04W 84/042; H04W 24/08; H04W 24/02
See application file for complete search history.

(56) References Cited

U.S. PATENT DOCUMENTS 10,778,755 B1 * 9/2020 Campbell ............... H04L 47/20
2020/0404069 A1 * 12/2020 Li ........................... H04L 67/59

* cited by examiner

*Primary Examiner* — Said M Elnoubi
(74) *Attorney, Agent, or Firm* — Foley IP Law, PLLC (57) ABSTRACT

An orchestration tool determines optimal user plane function (UPF) positioning by using edge nodes as proxy for UPF performance prediction. A disclosed solution includes: using a plurality of edge nodes as proxies to predict performance of a UPF, which has not yet been built, for routing data packets to a proxy-call session control function (P-CSCF) from locations of each of the plurality of edge nodes; selecting, by an orchestrator, a first edge node location; and generating, by the orchestrator, an alert indicating selection of the first edge node location. A first UPF will be built at the first edge node location although, in some examples, upon further monitoring, the orchestrator may determine that the second edge node location will outperform the first edge node location, resulting in the UPF moving to the second edge node location. In some examples, performance criteria depend on traffic type (e.g., real-time gaming).

20 Claims, 5 Drawing Sheets

USING EDGE NODES AS PROXIES TO SELECT UPF POSITIONING

CROSS-REFERENCE TO RELATED APPLICATION

This application is a continuation-in-part (CIP) of co-pending and commonly-owned U.S. patent application Ser. No. 17/095,146, filed on Nov. 11, 2020, titled "UPF Positioning for Mobile Edge Computing Services", and claims priority thereto.

BACKGROUND

In mobile edge computing (MEC), resources are located relatively close to end users and/or internet of things (IoT) endpoints in an attempt to optimize performance for low latency and/or high bandwidth (high throughput) services, such as real time gaming and augmented reality (AR). In 5G, cellular devices (e.g., user equipment, UEs) connect to external resources via an external data network, such as a portion of the internet or another network. Wireless UEs reach the external data network via a wireless connection to a base station (e.g., a gNB or gNodeB), and then through a user plane function (UPF).

In some scenarios, UPF position relative to the base station may have a significant impact on end-to-end (E2E) performance, for example, affecting latency and/or throughput. Positioning a UPF in a sub-optimal location may then result in degraded user experiences. In some scenarios, UPFs may be deployed "on the fly." Without an E2E service orchestration system that knows where to place or position the UPF to ensure that the lowest latency achieved and/or highest throughput is achieved, the investment of building a new UPF is at risk.

SUMMARY

The following summary is provided to illustrate examples disclosed herein, but is not meant to limit all examples to any particular configuration or sequence of operations.

An orchestration tool determines optimal user plane function (UPF) positioning by using edge nodes as proxy for UPF performance prediction. A disclosed solution includes: using a plurality of edge nodes as proxies to predict performance of a UPF, which has not yet been built, for routing data packets to a proxy-call session control function (P-CSCF) from locations of each of the plurality of edge nodes; selecting, by an orchestrator, a first edge node location; and generating, by the orchestrator, an alert indicating selection of the first edge node location.

BRIEF DESCRIPTION OF THE DRAWINGS

The disclosed examples are described below with reference to the accompanying drawing figures listed below, wherein.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

An orchestration tool determines optimal user plane function (UPF) positioning by using edge nodes as proxy for UPF performance prediction. A disclosed solution includes: using a plurality of edge nodes as proxies to predict performance of a UPF, which has not yet been built, for routing data packets to a proxy-call session control function (P-CSCF) from locations of each of the plurality of edge nodes; selecting, by an orchestrator, a first edge node location; and generating, by the orchestrator, an alert indicating selection of the first edge node location. A first UPF will be built at the first edge node location although, in some examples, upon further monitoring, the orchestrator may determine that the second edge node location will outperform the first edge node location, resulting in the UPF moving to the second edge node location. In some examples, performance criteria depend on traffic type (e.g., real-time gaming or augmented reality).

A disclosed tool (an orchestrator) improves the speed of cellular networks (e.g., reduced latency and/or higher throughput) by selecting an edge node from a plurality of edge nodes, at which to build a UPF, based on at least edge node performance values (for the plurality of edge nodes). A UPF carries user plane data packets between a base station and a data network that is external to a cellular network or an internet protocol (IP) multimedia subsystem (IMS), and is not merely an edge compute node that offloads computations from a for a user equipment (UE) and then returns the result to the UE.

Using the disclosed tool improves end-to-end (E2E) service orchestration when spinning up mobile edge computing (MEC) services by optimally positioning UPFs (needed to run the user-plane of the end users) to meet different requirements of services being deployed. The orchestrator determines the performance of various edge computing nodes that are in the vicinity of an expected surge in network traffic. Upon receiving (or determining) performance criteria, such as latency and throughput thresholds, an edge node is selected for building out a UPF. This removes guesswork of identifying the best (optimal) location for the new UPF. After the UPF is in place and operating, the tool may continue to monitor the UPF performance. If the UPF performance degrades, and a second edge node has sufficient performance, the UPF may be moved from the first edge node to the second edge node. This proactive monitoring permits the UPF to be moved when necessary, to maintain a high quality of experience for deployed services.

Figure 1:
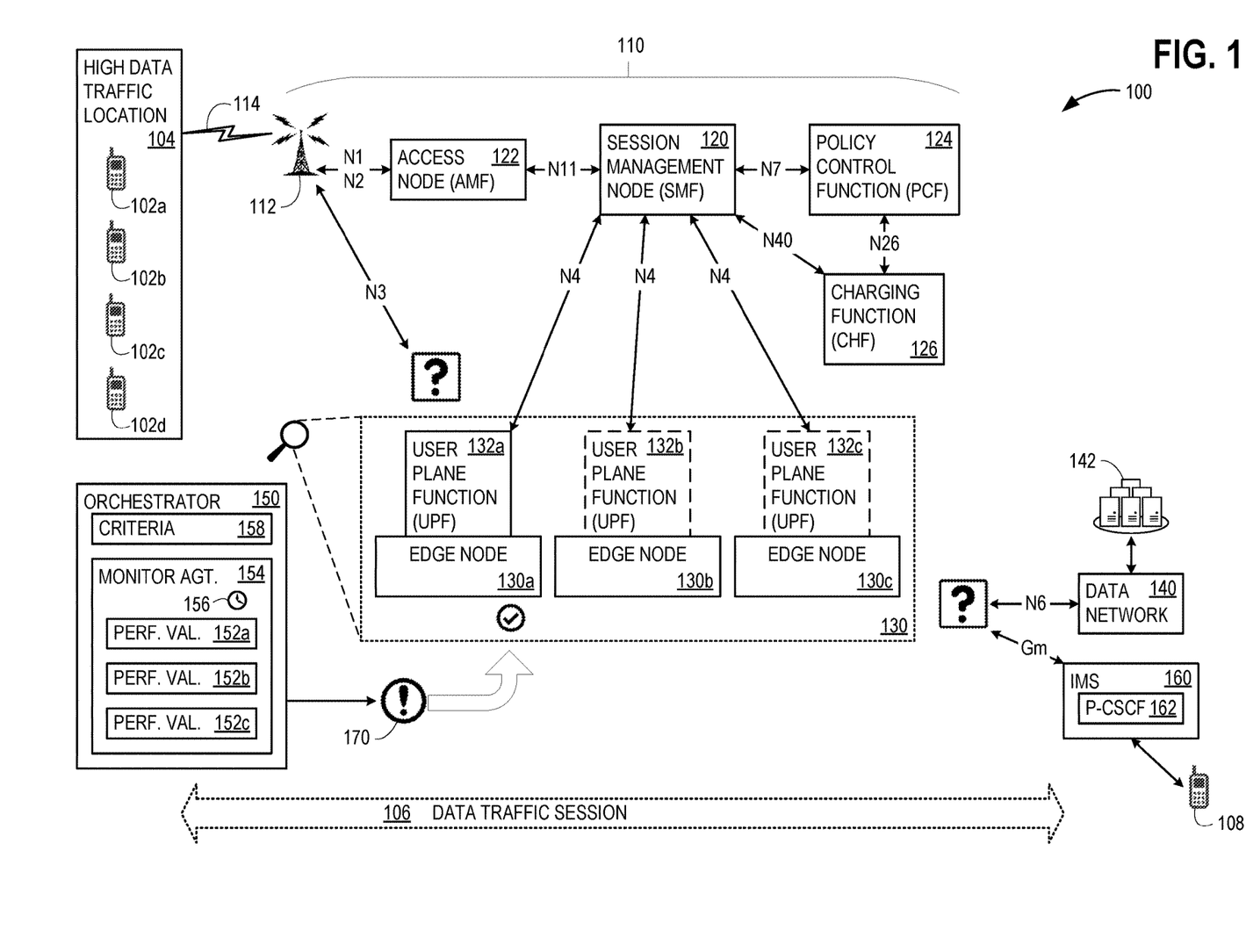
FIG. 1 illustrates an exemplary arrangement that advantageously determines optimal user plane function (UPF) positioning by using edge nodes as proxy for UPF performance prediction.

FIG. 1 illustrates an exemplary arrangement 100 that uses an orchestrator 150 to advantageously determine optimal UPF positioning for MEC services over a wireless network 110 (e.g., a 5G cellular network). Orchestrator 150 uses edge nodes as proxies to predict performance of a UPF that will route user plane data packets for UEs. A plurality of UEs 102*a*, 102*b*, 102*c*, and 102*d* are located in (or are predicted to be located in) a high data traffic location 104. In an example scenario, a new real-time gaming, virtual reality (VR), or augmented reality (AR) activity is planned to begin operating at high data traffic location 104. The activity will be using UEs 102a, 102b, 102c, and 102d, which connect to wireless network 110 via a base station 112, using an air interface 114. A surge in data traffic through base station 112 is therefore expected, which will pass through a UPF in order to reach an external data network 140. The service endpoint target for the data traffic is a network resource 142, for example a computational or storage resource that handles real-time gaming, VR, and/or AR data. In some examples, base station 112 comprises a radio access network (RAN), such as a gNodeB (network equipment that transmits and receives wireless communications between UE and a mobile network, also known as gNB).

Base station 112 is supported by a session management function (SMF) 120, via an Access and Mobility Management Function (AMF) 122. SMF 120 uses a policy charging function (PCF) 124 and a charging function (CHF) 126 to provide services to UEs 102a, 102b, 102c, and 102d. Data traffic between each of UE 102a, UE 102b, UE 102c, and UE 102d (e.g., through base station 112) and AMF 122 may use an N1 and/or an N2 interface. Data traffic between AMF 122 and SMF 120 may use an N11 interface; data traffic between SMF 120 and PCF 124 may use an N7 interface; data traffic between SMF 120 and CHF 126 may use an N40 interface; and data traffic between PCF 124 and CHF 126 may uses an N26 interface.

In arrangement 100, a wireless network 110 provides a data traffic session 106 for UE 102a, for example a voice call with another UE 108 or a data packet session with network resource 142 via external data network 140. Wireless network 110 routes cellular data traffic of data traffic session 106 through a UPF. Signaling for setting up data traffic session 106 passes from base station 112 through AMF 122 to SMF 120. Data packets of data traffic session 106 pass from base station 112 through a UPF and to external data network 140 or a proxy-call session control function (P-CSCF) 162 of IMS 160.

5G cellular network employs control plane and user plane separation (CUPS), which separates wireless network 110 into a control plane and a user plane. The control plane includes at least AMF 122 and SMF 120. Data packets for signaling and data session control are routed between base station 112 and SMF 120 through AMF 122. A UPF is within the user plane.

AMF 122 supports the termination of non-access stratum (NAS) signaling, which is a functional layer in wireless telecom protocol stacks between core network equipment of wireless network 110 and UEs. NAS signaling is used to manage the establishment of communication sessions and for maintaining continuous communications with the user equipment as they move. Base station 112 selects AMF 122 (from a plurality of access nodes in wireless network 110) for a particular UE, based on network slicing constraints and support requested by the UE. Network slicing partitions wireless network 110 into multiple virtual networks.

To handle the surge in data traffic through base station 112 to external data network 140, a new UPF will be needed. Data traffic between base station 112 and the new UPF may use an N3 interface; data traffic between SMF 120 and the new UPF may use an N4 interface; and data traffic between external data network 140 and the new UPF may use an N6 interface. A plurality of candidate locations for the new UPF exist at each of a plurality of edge nodes 130, for example edge node 130a, edge node 130b, and edge node 130c. Although three edge nodes are illustrated, it should be understood that a different number of edge nodes may serve as candidate locations for the new UPF.

As will be described in further detail in relation to FIGS. 2 and 3, an orchestrator 150 selects an edge node (e.g., edge node 130a) from plurality of edge nodes 130, and generates an alert 170 indicating the selection of the edge node. To accomplish this orchestrator 150 receives or determines UPF use case performance criteria 158, which is the performance needed for the use case (or use cases) that is expected to be run on the new UPF. Some use cases may require low latency, some may require high throughput, and some may require both. In some examples, UPF use case performance criteria 158 may include the most stringent criteria for a plurality of predicted use cases. In some examples, receiving or determining UPF use case performance criteria 158 may include either direct input of UPF use case performance criteria 158 or determination (e.g., using a look-up table) of UPF use case performance criteria 158 based on at least the type of network traffic to be supported. UPF use case performance criteria 158 may include latency and/or throughput performances or thresholds. A monitoring agent 154 tests or otherwise receives key performance indicators (KPIs) for each of edge nodes 130a, 130b, and 130c, and stores them as edge node performance values 152a, 152b, and 152c, respectively. Edge node performance values 152a, 152b, and 152c may be determined using a testing function 156 that calculates elapsed times for test signals to pass between base station 112 and each of edge nodes 130a, 130b, and 130c.

In some examples, orchestrator 150 monitors each of edge nodes 130a, 130b, and 130c over time, in order to determine both long-term performance averages and performance degradation history (e.g., frequency and duration of outages). If orchestrator 150 selects edge node 130a, the new UPF will be built as UPF 132a at edge node 130a; if orchestrator 150 selects edge node 130b, the new UPF will be built as UPF 132b at edge node 130b; and if orchestrator 150 selects edge node 130c, the new UPF will be built as UPF 132c at edge node 130c.

At the point in time illustrated in FIG. 1, orchestrator 150 has selected the location of edge node 130a as the location to build a new UPF. In some examples, orchestrator 150 will continue monitoring different KPIs of the running service and relocate the UPF deployment in case the quality of experience based on the collected KPIs deteriorates.

UPF 132a performs packet routing and forwarding, packet inspection, and quality of service (QoS) handling for user plane data packets. UPF 132a handles external protocol data unit (PDU) sessions between wireless network 110 and external data network 140. One function of UPF 132a is to route user plane data packets between base station 112 and P-CSCF 162, under management by SMF 120. The network segment between base station 112 and UPF 132a uses an N3 reference interface, the network segment between UPF 132a and external data network 140 uses an N6 reference interface, and the network segment between UPF 132a and P-CSCF 162 uses a Gm reference interface.

SMF 120 is responsible for interacting with the decoupled data plane, creating updating and removing protocol data unit (PDU) sessions and managing session context with new UPF 132a using an N4 reference interface. P-CSCF 162 the contact point between wireless network 110 and IMS 160 and functions as a proxy server for the UEs whose user plane data packets pass through base station 112 and UPF 132a. Session initiation protocol (SIP) signaling traffic to and from a UE passes through UPF 132a. UEs discover P-CSCF 162 via a discovery process using a network function (NF)

repository function (NRF) in wireless network 110. P-CSCF 162 may be located within wireless network 110 or within IMS 160.

Multiple benefits arise from CUPS. One benefit is that SMF 120 may be located in a centralized location for ease of management, while UPF 132*a* is located elsewhere, based on latency and other performance issues for user plane data traffic to/from UEs. This is a key performance enhancement for highly mobile connected applications and geographically-dispersed examples of wireless network 110. Another benefit is that wireless network 110 may have the control plane capacity and user plane capacity scaled separately, based on actual and expected dominant traffic type. Cellular networks may use orthogonal frequency-division multiple access (OFDMA), which uses a combination of orthogonal frequency-division multiplexing (OFDM) and time domain multiple access (TDMA). With TDMA, all of the UEs being served by a base station must limit their transmissions to allocated time slots.

Figure 2:
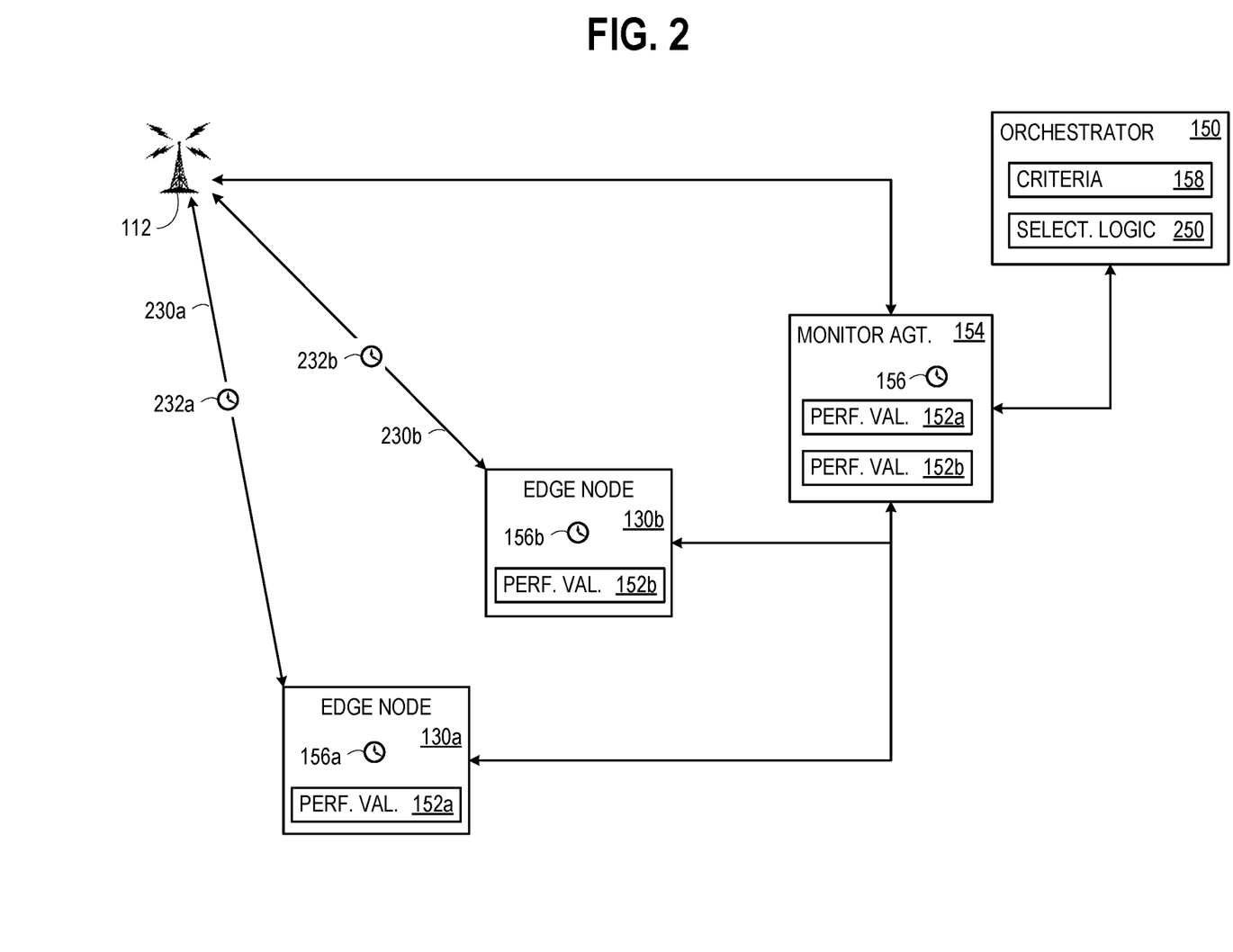
FIG. 2 illustrates further detail for the arrangement of FIG. 1.

FIG. 2 illustrates further detail regarding the determination of for edge node performance values. For clarity, only edge nodes 130*a* and 130*b* are shown; the process for edge node 130*c* is similar as described below. As illustrated in FIG. 2, monitoring agent 154 is external to orchestrator 150, although in some examples, orchestrator 150 comprises monitoring agent 154. A test signal 230*a* is sent between base station 112 and edge node 130*a*. Time information 232*a* is collected and used to determine edge node performance values 152*a*. Edge node performance values 152*a* may include latency and/or throughput values from base station 112 to edge node 130*a*, from edge node 130*a* to base station 112, and/or round trip. Other KPIs, such as outage frequency and durations, and bit error rate (BER) may also be included. Similarly, test signal 230*b* is sent between base station 112 and edge node 130*b*. Time information 232*b* is collected and used to determine edge node performance values 152*b*, which may have values corresponding to those of edge node performance values 152*b*.

In some examples, testing function 156, within monitoring agent 154, determines both edge node performance values 152*a* and 152*b*, and initiates the testing. In some examples, a testing function 156*a*, within edge node 130*a*, determines edge node performance values 152*a* and a testing function 156*b*, within edge node 130*b*, determines edge node performance values 152*b*. When edge nodes 130*a* and 130*b* collect their own performance values, monitoring agent 154 (or orchestrator 150) requests the performance values from edge nodes 130*a* and 130*b*. In some examples, monitoring agent 154 obtains at least some of the performance value information (e.g., some of time information 232*a* and 232*b*) from base station 112.

In some examples, monitoring agent 154 pushes edge node performance values 152*a* and 152*b* to orchestrator 150, such as on a schedule. In some examples, orchestrator 150 requests (pulls) edge node performance values 152*a* and 152*b* from monitoring agent 154. Orchestrator 150 uses selection logic 250 to perform the selection of the edge node for the new UPF.

Figure 3:
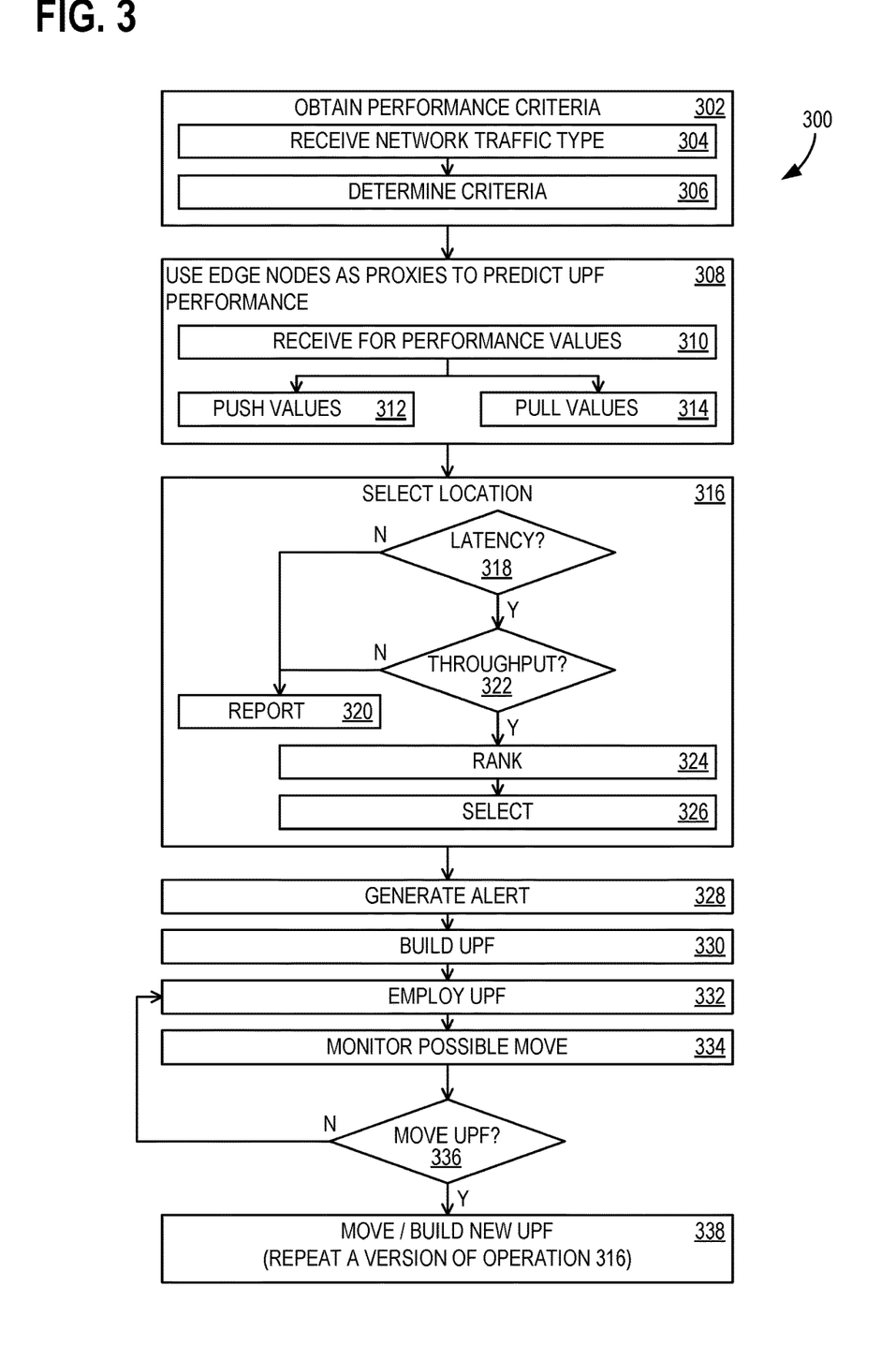
FIG. 3 illustrates a flowchart of exemplary operations associated with the arrangement of FIG. 1.

FIG. 3 illustrates a flowchart 300 of exemplary operations associated with establishing a UPF for wireless network 110. In some examples, at least a portion of flowchart 300 may be performed using one or more computing devices 500 of FIG. 5. In some examples, wireless network 110 comprises a 5G cellular network. Flowchart 300 commences with operation 302, which includes obtaining, by orchestrator 150, UPF use case performance criteria 158. In some examples, operation 302 includes operations 304 and 306.

Operation 304 includes receiving an indication of a type of network traffic to be supported. In some examples, the type of network traffic to be supported comprises real-time gaming, VR, AR, and/or streaming video.

Operation 306 includes, based on at least the type of network traffic to be supported, determining UPF use case performance criteria 158. In some examples, UPF use case performance criteria 158 comprise an indication of a latency preference and/or an indication of a throughput performance. In some examples, the latency preference comprises a latency value preference between an edge node and a base station in communication with a wireless UE. In some examples, the latency preference comprises a latency value threshold. In some examples, the latency value threshold is set to a value of 10 milliseconds or less. In some examples, the throughput performance comprises a throughput value preference between an edge node and a base station in communication with a wireless UE. In some examples, the throughput performance comprises a throughput value threshold. In some examples, base station 112 comprises a gNodeB.

Operation 308 uses plurality of edge nodes 130 (e.g., edge node 130*a*, edge node 130*b*, and edge node 130*c*) as proxies to predict performance of UPF 132*a*, which has not yet been built, for routing data packets to P-CSCF 162 from locations of the each of plurality of edge nodes 130. In some examples, orchestrator 150 comprises monitoring agent 154. In some examples, monitoring agent 154 is external to orchestrator 150. Operation 308 includes multiple actions, shown as operations 310-314. Operation 310 includes testing, by monitoring agent 154 (which is associated with orchestrator 150), plurality of edge nodes 130 to determine edge node performance values 152*a*, 152*b*, and 152*c* and receiving, by orchestrator 150, for plurality of edge nodes 130, edge node performance values 152*a*, 152*b*, and 152*c*. In some examples, at least one edge node within plurality of edge nodes 130 determines its own performance values. In such examples, receiving, by orchestrator 150, edge node performance values 152*a*, 152*b*, and 152*c* comprises requesting edge node performance values 152*a*, 152*b*, and 152*c* from plurality of edge nodes 130. In some examples, requesting edge node performance values 152*a*, 152*b*, and 152*c* from plurality of edge nodes 130 comprises requesting, by monitoring agent 154, edge node performance values 152*a*, 152*b*, and 152*c* from plurality of edge nodes 130.

Multiple options are available to get edge node performance values 152*a*, 152*b*, and 152*c* to orchestrator 150. One option, operation 312, includes pushing, by monitoring agent 154, to orchestrator 150, edge node performance values 152*a*, 152*b*, and 152*c*. Another option, operation 314 includes requesting, by orchestrator 150, from monitoring agent 154, edge node performance values 152*a*, 152*b*, and 152*c*. Operation 314 is a pull operation. In some examples, receiving, by orchestrator 150, edge node performance values 152*a*, 152*b*, and 152*c* comprises requesting edge node performance values 152*a*, 152*b*, and 152*c* from plurality of edge nodes 130. In some examples, requesting edge node performance values 152*a*, 152*b*, and 152*c* from plurality of edge nodes 130 comprises requesting, by monitoring agent 154, edge node performance values 152*a*, 152*b*, and 152*c* from plurality of edge nodes 130.

The selection of the location for the new UPF 132*a* is performed in operation 316, which includes based on at least the received edge node performance values, selecting a first edge node location (e.g., the location of edge node 130*a*) from a plurality of edge node locations (e.g., the locations of plurality of edge nodes 130). In some examples, selecting the first edge node location comprises ranking the received edge node performance values, and selecting the first edge node location based on the ranking. In some examples, selecting the first edge node location comprises determining whether the received edge node performance values for the first edge node meets the latency value threshold, and based on at least determining that the received edge node performance values for the first edge node meets the latency value threshold, selecting the first edge node location. In some examples, selecting the first edge node location comprises determining whether the received edge node performance values for the first edge node meets the throughput value threshold, and based on at least determining that the received edge node performance values for the first edge node meets the throughput value threshold, selecting the first edge node location. These are accomplished using operations 318-326.

Decision operation 318 includes determining whether the received edge node performance values for the first edge node meets the latency value threshold. If not, a report may be issued in operation 320, to alert network operators or other maintainers. If the latency threshold is met, decision operation 322 includes determining whether the received edge node performance values for the first edge node meets the throughput value threshold. If not, a report may be issued in operation 320, to alert network operators or other maintainers. If the throughput threshold is met, operation 324 includes ranking the received edge node performance values. Operation 326 then includes selecting the first edge node location based on the ranking. Operation 326 therefore may include one or more of the following features: based on at least determining that the received edge node performance values for the first edge node meets the latency value threshold, selecting the first edge node location; and based on at least determining that the received edge node performance values for the first edge node meets the throughput value threshold, selecting the first edge node location.

Operation 328 includes generating alert 170 indicating the selection of the first edge node location. Operation 330 includes building a first UPF at the first edge node (e.g., building UPF 132a at the location of edge node 130a). Operation 332 employs UPF 132a for data traffic sessions (e.g., data traffic session 106) for example, by routing user plane data packets, by UPF 132a, between base station 112 of wireless network 110 and P-CSCF 162 and/or external data network 140.

Operation 334 provides ongoing monitoring, in order to determine whether UPF 132a should be moved. This includes monitoring UPF performance values for the first UPF at the first edge node, and monitoring edge node performance values for a remainder portion of plurality of edge nodes 130 (e.g., edge nodes 130b and 130c). Operations 332 and 334 may use the same test, push, and pull options as described above for operation 308.

Decision operation 336 includes, based on at least UPF use case performance criteria 158, determining that a second edge node of plurality of edge nodes 130 outperforms the first edge node (e.g., edge node 130b outperforms edge node 130a). Decision operation 336 is used to determine whether to move UPF 132a (e.g., to become UPF 132b or UPF 132c), and may follow a process similar to that described above for operation 316. In some examples, decision operation 336 includes receiving user input. For example, if edge node 130b outperforms edge node 130a, but the KPIs for edge node 130a are still acceptable (e.g., meeting UPF use case performance criteria 158), then the user (whose use case drove the need for the new UPF) may optionally request that the UPF location move to the better-performing node. However, if the KPIs for edge node 130a are no longer acceptable (e.g., failing to meet UPF use case performance criteria 158), then the UPF location moves to the better-performing node without waiting for feedback from the user about poor network performance.

If a move is not warranted, flowchart 300 returns to using UPF 132a in operation 332 and ongoing monitoring in operation 334. Otherwise, if a move is warranted, operation 338 includes, based on at least determining that the second edge node outperforms the first edge node, building a second UPF (e.g., UPF 132b) at the location of the second edge node (e.g., edge node 130b). Operation 338 may include a version of operation 316, in which each of the edge nodes is checked for acceptable performance and ranked prior to selecting the new location for building the second UPF.

In some examples, the second UPF is an additional UPF, such that both UPF 132a and UPF 132b are built and in use. In some examples, the second UPF replaces the first UPF (e.g., UPF 132a is moved and becomes UPF 132b). In scenarios involving moving, rather than adding, a UPF, operation 338 also includes, based at least on building the second UPF at the second edge node location, removing the first UPF from the first edge node location. That is, building UPF 132b at the location of edge node 130b comprises moving the hardware of UPF 132a from the location of edge node 130a to the location of edge node 130b.

Figure 4:
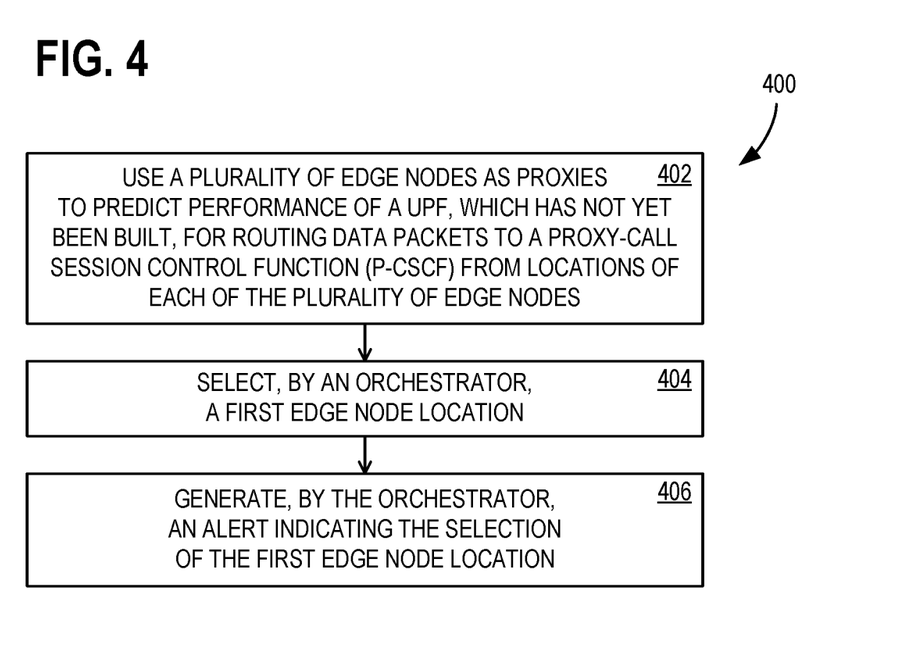
FIG. 4 illustrates another flowchart of exemplary operations associated with the arrangement of FIG. 1.

FIG. 4 illustrates a flowchart 400 of exemplary operations associated with establishing a UPF for a wireless network. In some examples, at least a portion of flowchart 400 may be performed using one or more computing devices 500 of FIG. 5. Operation 402 includes using a plurality of edge nodes as proxies to predict performance of a UPF, which has not yet been built, for routing data packets to a P-CSCF from locations of each of the plurality of edge nodes. Operation 404 includes selecting, by an orchestrator, a first edge node location. Operation 406 includes generating, by the orchestrator, alert 170 indicating selection of the first edge node location.

Figure 5:
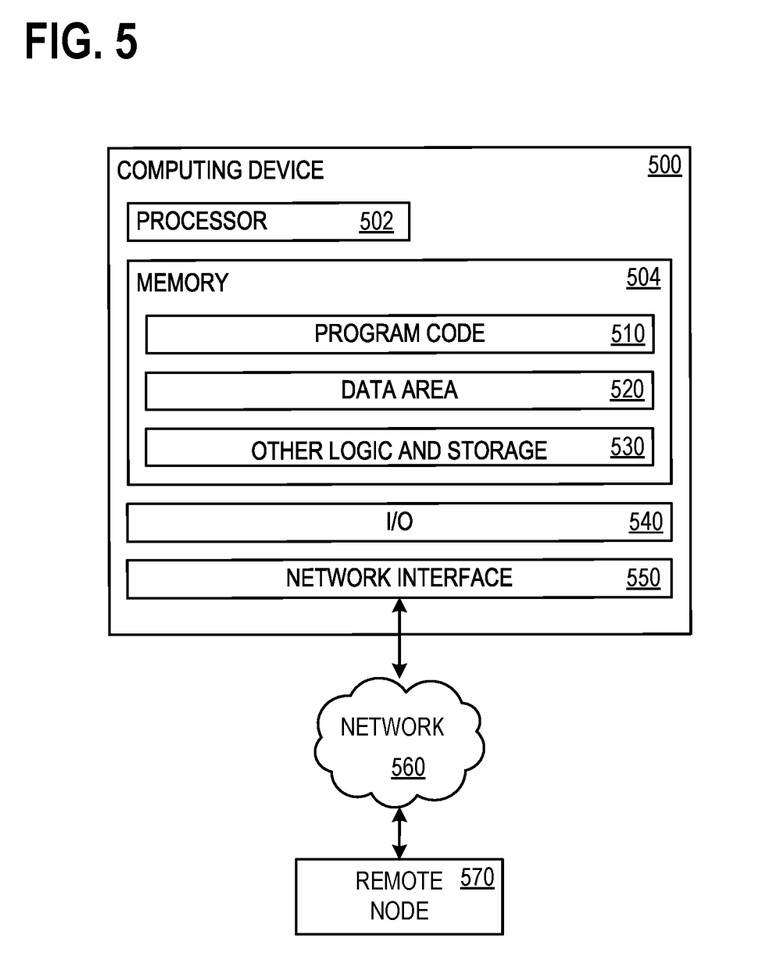
FIG. 5 illustrates a block diagram of a computing device that may be used as a component of the arrangement illustrated in FIG. 1.

FIG. 5 illustrates a block diagram of computing device 500 that may be used as a component of arrangement 100 of FIG. 1, for example, as any component described herein that may require computational or storage capacity. Computing device 500 has at least a processor 502 and a memory 504 that holds program code 510, data area 520, and other logic and storage 530. Memory 504 is any device allowing information, such as computer executable instructions and/or other data, to be stored and retrieved. For example, memory 504 may include one or more random access memory (RAM) modules, flash memory modules, hard disks, solid-state disks, persistent memory devices, and/or optical disks. Program code 510 comprises computer executable instructions and computer executable components including any instructions necessary to perform operations described herein. Data area 520 holds any data necessary to perform operations described herein. Memory 504 also includes other logic and storage 530 that performs or facilitates other functions disclosed herein or otherwise required of computing device 500. An input/output (I/O) component 540 facilitates receiving input from users and other devices and generating displays for users and outputs for other devices. A network interface 550 permits communication over a network 560 with a remote node 570, which may represent another implementation of computing device 500. For example, a remote node 570 may represent another of the above-noted nodes within arrangement 100.

Additional Examples

An exemplary method of establishing a UPF for a wireless network comprises: using a plurality of edge nodes as proxies to predict performance of a UPF, which has not yet been built, for routing data packets to a P-CSCF from locations of each of the plurality of edge nodes; selecting, by an orchestrator, a first edge node location; and generating, by the orchestrator, an alert indicating selection of the first edge node location.

An exemplary system for establishing a UPF for a wireless network comprises: a processor; and a computer-readable medium storing instructions that are operative upon execution by the processor to: use a plurality of edge nodes as proxies to predict performance of a UPF, which has not yet been built, for routing data packets to a P-CSCF from locations of each of the plurality of edge nodes; select, by an orchestrator, a first edge node location; and generate, by the orchestrator, an alert indicating selection of the first edge node location.

One or more exemplary computer storage devices has computer-executable instructions stored thereon which, on execution by a computer, cause the computer to perform operations comprising: using a plurality of edge nodes as proxies to predict performance of UPF, which has not yet been built, for routing data packets to a P-CSCF from locations of each of the plurality of edge nodes; selecting, by an orchestrator, a first edge node location; and generating, by the orchestrator, an alert indicating selection of the first edge node location.

Alternatively, or in addition to the other examples described herein, examples include any combination of the following:

building a first UPF at the first edge node location;
    routing user plane data packets, by the first UPF, between a base station of the wireless network and a P-CSCF;
    routing user plane data packets, by the first UPF, between a base station of the wireless network and an external data network that is external to the wireless network;
    using the plurality of edge nodes as proxies to predict performance of the UPF comprises receiving, by the orchestrator, for the plurality of edge nodes, edge node performance values;
    the UPF use case performance criteria comprises an indication of a latency preference;
    the UPF use case performance criteria comprises an indication of a throughput performance;
    receiving the UPF use case performance criteria comprises receiving an indication of a type of network traffic to be supported;
    based on at least the type of network traffic to be supported, determining the UPF use case performance criteria;
    testing, by a monitoring agent associated with the orchestrator, the plurality of edge nodes to determine the edge node performance values;
    receiving, by the orchestrator, the edge node performance values comprises requesting the edge node performance values from the plurality of edge nodes;
    monitoring UPF performance values for a first UPF at the first edge node;
    monitoring edge node performance values for a remainder portion of the plurality of edge nodes;
    determining that a second edge node location outperforms the first edge node; based on at least determining that the second edge node outperforms the first edge node, building a second UPF at the second edge node location;
    building the second UPF at the second edge node location comprises moving hardware of the first UPF from the first edge node location to the second edge node location;
    the system further comprises a first UPF at the first edge node location;
    the system further comprises a second UPF at the second edge node location;
    the wireless network comprises a 5G cellular network;
    the base station comprises a gNodeB;
    the latency preference comprises a latency value preference between an edge node and a base station in communication with a wireless UE;
    the latency preference comprises a latency value threshold;
    the latency value threshold is set to a value of 10 milliseconds or less;
    the throughput performance comprises a throughput value preference between an edge node and a base station in communication with a wireless UE;
    the throughput performance comprises a throughput value threshold;
    the type of network traffic to be supported comprises real-time gaming, VR, AR, and/or streaming video;
    ranking the received edge node performance values;
    selecting the first edge node based on the ranking;
    selecting the first edge node comprises ranking the received edge node performance values, and selecting the first edge node based on the ranking;
    determining whether the received edge node performance values for the first edge node meets the latency value threshold;
    the orchestrator comprises the monitoring agent;
    the monitoring agent is external to the orchestrator;
    pushing, by the monitoring agent, to the orchestrator, the edge node performance values;
    monitoring UPF performance values for the first UPF comprises pushing, by the monitoring agent, to the orchestrator, the UPF performance values;
    requesting, by the orchestrator, from the monitoring agent, the edge node performance values;
    monitoring UPF performance values for the first UPF comprises requesting, by the orchestrator, from the monitoring agent, the UPF performance values;
    requesting the edge node performance values from the plurality of edge nodes comprises requesting, by the monitoring agent, the edge node performance values from the plurality of edge nodes;
    at least one edge node within the plurality of edge nodes determines its own performance values; and
    based at least on building the second UPF at the second edge node, removing the first UPF.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements.

The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of establishing a user plane function (UPF) for a wireless network, the method comprising:
using a plurality of edge nodes as proxies to predict performance of a UPF, which has not yet been built, for routing data packets to a proxy-call session control function (P-CSCF) from locations of each of the plurality of edge nodes;
selecting, by an orchestrator, a first edge node location; and
generating, by the orchestrator, an alert indicating selection of the first edge node location.

2. The method of claim 1, further comprising:
building a first UPF at the first edge node location; and
routing user plane data packets, by the first UPF, between a base station of the wireless network and a P-CSCF.

3. The method of claim 1, wherein using the plurality of edge nodes as proxies to predict performance of the UPF comprises:
receiving, by the orchestrator, for the plurality of edge nodes, edge node performance values.

4. The method of claim 3, further comprising:
testing, by a monitoring agent associated with the orchestrator, the plurality of edge nodes to determine the edge node performance values.

5. The method of claim 3, wherein receiving, by the orchestrator, the edge node performance values comprises requesting the edge node performance values from the plurality of edge nodes.

6. The method of claim 1, further comprising:
receiving UPF use case performance criteria, wherein the UPF use case performance criteria comprises an indication of a latency preference and/or an indication of a throughput performance; and
wherein receiving the UPF use case performance criteria comprises:
receiving an indication of a type of network traffic to be supported; and
based on at least the type of network traffic to be supported, determining the UPF use case performance criteria.

7. The method of claim 1, further comprising:
monitoring UPF performance values for a first UPF at the first edge node;
monitoring edge node performance values for a remainder portion of the plurality of edge nodes;
determining that a second edge node location outperforms the first edge node; and
based on at least determining that the second edge node outperforms the first edge node, building a second UPF at the second edge node location, wherein building the second UPF at the second edge node location comprises moving hardware of the first UPF from the first edge node location to the second edge node location.

8. A system for establishing a user plane function (UPF) for a wireless network, the system comprising:
a processor; and
a computer-readable medium storing instructions that are operative upon execution by the processor to:
use a plurality of edge nodes as proxies to predict performance of a UPF, which has not yet been built, for routing data packets to a proxy-call session control function (P-CSCF) from locations of each of the plurality of edge nodes;
select, by an orchestrator, a first edge node location; and
generate, by the orchestrator, an alert indicating selection of the first edge node location.

9. The system of claim 8, wherein the system further comprises a first UPF at the first edge node location, and wherein the operations are further operative to:
route user plane data packets, by the first UPF, between a base station of the wireless network and a P-CSCF.

10. The system of claim 8, wherein using the plurality of edge nodes as proxies to predict performance of the UPF comprises:
receiving, by the orchestrator, for the plurality of edge nodes, edge node performance values.

11. The system of claim 10, wherein receiving, by the orchestrator, the edge node performance values comprises requesting the edge node performance values from the plurality of edge nodes.

12. The system of claim 10, wherein the operations are further operative to:
test, by a monitoring agent associated with the orchestrator, the plurality of edge nodes to determine the edge node performance values.

13. The system of claim 8, wherein the operations are further operative to:
receive UPF use case performance criteria, wherein the UPF use case performance criteria comprises an indication of a latency preference and/or an indication of a throughput performance; and
wherein receiving the UPF use case performance criteria comprises:
receiving an indication of a type of network traffic to be supported; and
based on at least the type of network traffic to be supported, determining the UPF use case performance criteria.

14. The system of claim 8, wherein the operations are further operative to:
monitor UPF performance values for a first UPF at the first edge node;
monitor edge node performance values for a remainder portion of the plurality of edge nodes;
determine that a second edge node location outperforms the first edge node; and
generate, by the orchestrator, an alert indicating selection of the second edge node location.

15. One or more computer storage devices having computer-executable instructions stored thereon which, on execution by a computer, cause the computer to perform operations comprising:
using a plurality of edge nodes as proxies to predict performance of a user plane function (UPF), which has not yet been built, for routing data packets to a proxy-call session control function (P-CSCF) from locations of each of the plurality of edge nodes;
selecting, by an orchestrator, a first edge node location; and generating, by the orchestrator, an alert indicating selection of the first edge node location.

16. The one or more computer storage devices of claim 15, wherein the operations further comprise:
routing user plane data packets, by the UPF, between a base station of a wireless network and a P-CSCF.

17. The one or more computer storage devices of claim 15, wherein using the plurality of edge nodes as proxies to predict performance of the UPF comprises:
receiving, by the orchestrator, for the plurality of edge nodes, edge node performance values.

18. The one or more computer storage devices of claim 17, wherein the operations further comprise:
testing, by a monitoring agent associated with the orchestrator, the plurality of edge nodes to determine the edge node performance values.

19. The one or more computer storage devices of claim 17, wherein receiving, by the orchestrator, the edge node performance values comprises requesting the edge node performance values from the plurality of edge nodes.

20. The one or more computer storage devices of claim 15, wherein the operations further comprise:
receiving UPF use case performance criteria, wherein the UPF use case performance criteria comprises an indication of a latency preference and/or an indication of a throughput performance; and
wherein receiving the UPF use case performance criteria comprises:
receiving an indication of a type of network traffic to be supported; and
based on at least the type of network traffic to be supported, determining the UPF use case performance criteria.

* * * * *